United States Patent
Tatsukawa

(10) Patent No.: US 10,302,268 B2
(45) Date of Patent: May 28, 2019

(54) VEHICULAR HEADLAMP

(71) Applicant: Koito Manufacturing Co., Ltd., Tokyo (JP)

(72) Inventor: Masashi Tatsukawa, Tokyo (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/816,383

(22) Filed: Nov. 17, 2017

(65) Prior Publication Data

US 2018/0149332 A1  May 31, 2018

(30) Foreign Application Priority Data

Nov. 28, 2016  (JP) ................................. 2016-230147

(51) Int. Cl.
| | |
|---|---|
| *F21S 41/25* | (2018.01) |
| *F21S 41/36* | (2018.01) |
| *B60Q 1/28* | (2006.01) |
| *F21S 41/32* | (2018.01) |
| *F21S 43/40* | (2018.01) |
| *F21S 41/365* | (2018.01) |
| *F21W 102/13* | (2018.01) |
| *F21W 103/10* | (2018.01) |

(52) U.S. Cl.
CPC ................ *F21S 41/25* (2018.01); *B60Q 1/28* (2013.01); *F21S 41/321* (2018.01); *F21S 41/36* (2018.01); *F21S 41/365* (2018.01); *F21S 43/40* (2018.01); *F21W 2102/13* (2018.01); *F21W 2103/10* (2018.01)

(58) Field of Classification Search
None
See application file for complete search history.

(56) References Cited

U.S. PATENT DOCUMENTS 7,416,323 B2 *  8/2008  Okada ..................... F21S 41/17
                                                                362/538
7,520,647 B2 *  4/2009  Tachibana ............. F21S 41/255
                                                                362/516
(Continued)

FOREIGN PATENT DOCUMENTS

JP  2009-266434 A  11/2009
JP  2010-108727 A   5/2010
(Continued)

OTHER PUBLICATIONS

An Office Action dated Oct. 22, 2018, issued from the Korean Intellectual Property Office (KIPO) of Korean Patent Application No. 10-2017-0154645 and an English translation thereof.

*Primary Examiner* — Christle I Marshall
(74) *Attorney, Agent, or Firm* — Abelman, Frayne & Schwab

(57) ABSTRACT

A vehicular headlamp includes: a light source emitting light; a projection lens through which the light emitted from the light source is transmitted; and a reflective plate positioned between the light source and the projection lens so as to reflect a portion of the light emitted from the light source toward the projection lens. An emission direction of at least a portion of the light reflected by the reflective plate from the projection lens is different from an emission direction of light emitted from the projection lens and forming a light distribution pattern.

12 Claims, 2 Drawing Sheets

(56) References Cited

U.S. PATENT DOCUMENTS 8,348,486 B2 * 1/2013 Nakada ................. F21S 41/147
362/538
8,465,188 B2 * 6/2013 Sasaki .................... F21V 29/75
362/545

FOREIGN PATENT DOCUMENTS

| JP | 2010-153259 A | 7/2010 |
| JP | 2013-016259 A | 1/2013 |

* cited by examiner

VEHICULAR HEADLAMP

CROSS-REFERENCE TO RELATED APPLICATIONS

This application is based on and claims priority from Japanese Patent Application No. 2016-230147, filed on Nov. 28, 2016, with the Japan Patent Office, the disclosure of which is incorporated herein in its entirety by reference.

TECHNICAL FIELD

The present disclosure relates to a technical field of a vehicular headlamp including a light source that emits light and a projection lens through which the light emitted from the light source is transmitted.

BACKGROUND

The vehicular headlamp includes a so-called projector-type vehicular headlamp in which a light source and a projection lens are arranged inside a lamp outer casing configured by a cover and a lamp housing (see, e.g., Japanese Patent Laid-Open Publication No. 2010-108727).

In such a vehicular headlamp, the light emitted from the light source is controlled to become substantially parallel by the projection lens, and the light emitted from the projection lens and formed in a predetermined light distribution pattern is irradiated toward the outside.

SUMMARY

As described above, in the projector-type vehicular headlamp having a projection lens, the light emitted from the light source is emitted toward the outside as a substantially parallel light.

Therefore, when, for example, a pedestrian or other vehicle's passenger is aware of the presence of a vehicle at night, the light emitted from the projection lens (substantially parallel light) is difficult to see due to a viewing angle with respect to the vehicle. Thus, only a portion of the projection lens may be shined or the projection lens may be partially shined, thereby resulting in poor visibility. In particular, there are many cases where the vehicle is viewed obliquely upward, for example, by a pedestrian, and thus, such cases are likely to cause a deterioration in the visibility.

Therefore, the vehicular headlamp of the present disclosure aims to overcome the above-described problem and improve the visibility of the vehicular headlamp.

First, in order to solve the above-described problem, the vehicular headlamp according to the present disclosure includes: a light source which emits light; a projection lens through which the light emitted from the light source is transmitted; and a reflective plate which is positioned between the light source and the projection lens so as to reflect a portion of the light emitted from the light source toward the projection lens. An emission direction of at least a portion of the light reflected by the reflective plate from the projection lens is different from an emission direction of light that is emitted from the projection lens and forms a light distribution pattern.

Thus, at least a portion of the light reflected by the reflective plate is emitted in a different direction from the projection lens with respect to the light forming a light distribution pattern.

Secondly, the vehicular headlamp according to the present disclosure may further include a reflector which reflects the light emitted from the light source toward the projection lens, and light which is not reflected by the reflector in the light emitted from the light source may be incident on the reflective plate.

Thus, the light reflected by the reflector is used as light forming a light distribution pattern, and the light not reflected by the reflector is used as light reflected by the reflective plate.

Thirdly, the vehicular headlamp according to the present disclosure may further include a reflective member which reflects the light which is not reflected by the reflector at least toward the reflective plate.

Thus, the light which is not reflected by the reflector is reflected by the reflective member and is incident on the reflective plate.

Fourthly, the vehicular headlamp according to the present disclosure may include a shade provided between the light source and the projection lens to shield a portion of the light emitted from the light source. The shade may have a reflective surface formed thereon to reflect light at least toward the reflective plate, and the light reflected by the reflective member may be incident on the reflective plate and the reflective surface.

Thus, the light emitted from the light source is shielded and reflected by the shade.

Fifthly, in the vehicular headlamp according to the present disclosure, the projection lens is configured by a first projection lens that forms a light distribution pattern and a second projection lens on which the light reflected sequentially by the reflective member and the reflective plate is incident.

Thus, a light distribution pattern is formed by the light which may be transmitted through the first projection lens, and the light reflected sequentially by the reflective member and the reflective member is incident on the second projection lens.

Sixthly, in the vehicular headlamp according to the present disclosure, a width of the reflective plate in the horizontal direction may be equal to or greater than a width of an emission region in the horizontal direction of the projection lens on which the light reflected by the reflective plate is incident.

Thus, a reflective region of the reflective plate in the horizontal direction becomes more than an emission region in the horizontal direction of the projection lens.

Seventhly, the light reflected by the reflective plate may be incident on substantially the entire projection lens.

Thus, a portion of the light emitted from the light source is reflected by the reflective plate and is incident on substantially the entire projection lens, so that light is emitted from substantially the entire projection lens.

Eighthly, the emission direction of a portion of the light reflected by the reflective plate from the projection lens may be upward with respect to the emission direction of the light forming the light distribution pattern from the projection lens.

Thus, at least a portion of the light reflected by the reflective plate is emitted upward from the projection lens with respect to the light forming a light distribution pattern.

According to the present disclosure, since a portion of the light emitted from the light source is reflected by the reflective plate and at least a portion of the light reflected by the reflective plate is emitted in a different direction from the projection lens with respect to the light forming a light distribution pattern, the visibility of the vehicular headlamp may be improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Figure 1:
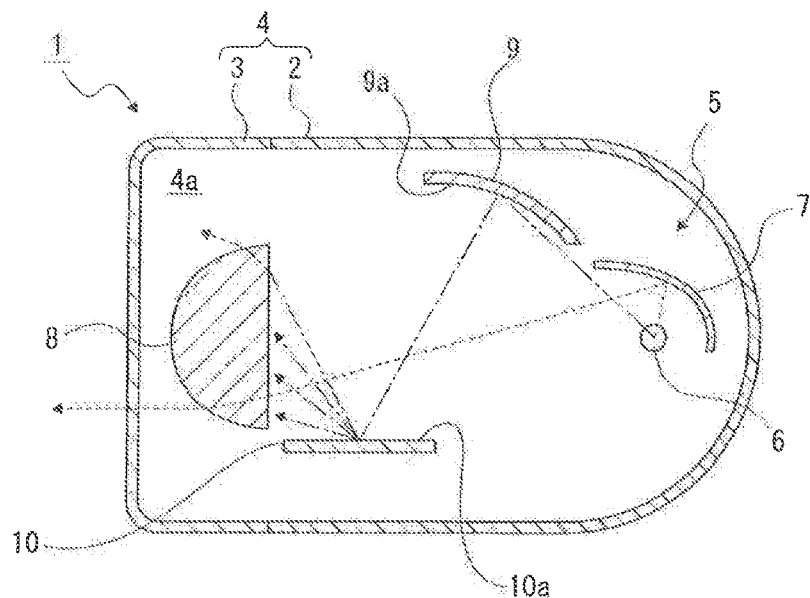
FIG. 1 illustrates an exemplary embodiment of a vehicular headlamp according to the present disclosure together with FIGS. 2 to 4 and is a cross-sectional view of the vehicular headlamp according to a first exemplary embodiment when viewed laterally.

First, a vehicular headlamp 1 according to a first exemplary embodiment will be described (see, e.g., FIGS. 1 and 2).

The vehicular headlamp 1 is attached to each of the left and right end portions of a front end portion of a vehicle body.

The vehicular headlamp 1 includes a lamp housing 2 having an opening at the front end and a cover 3 closing the opening of the lamp housing 2. A lamp outer casing 4 is configured by the lamp housing 2 and the cover 3, and the inside of the lamp outer casing 4 is formed as a lamp chamber 4a.

A lamp unit 5 is arranged in the lamp chamber 4a. The lamp unit 5 includes a light source 6 which emits light, a reflector 7 which reflects the light forward from the light source 6, and a projection lens 8 which transmits the light emitted from the light source 6. A shade (not illustrated) which shields a portion of the light emitted from the light source 6 is arranged in the lamp chamber 4a.

A reflective member 9 is arranged between the light source 6 and the projection lens 8. The reflective member 9 is positioned, for example, on the upper front side of the reflector 7 and is formed in a substantially curved and downwardly concave shape. The inner surface (lower surface) of the reflective member 9 is formed as a curved light reflective surface 9a.

A reflective plate 10 is arranged between the reflector 7 and the projection lens 8 in the lamp chamber 4a. The reflective plate 10 is positioned, for example, on the lower rear side of the projection lens 8 and is formed in a flat plate shape. Surface treatment such as embossing, vapor deposition, or gloss removal is performed on the upper surface of the reflective plate 10, and the upper surface of the reflective plate 10 is formed as a reflection control surface 10a.

Therefore, the light incident on the reflection control surface 10a is controlled to be reflected in a predetermined direction. When a diffusible surface treatment such as embossing is performed, the light is diffused and reflected in a predetermined direction.

The width of the reflective plate 10 in the horizontal direction is equal to or greater than the width of the emission region in the horizontal direction of the projection lens 8.

Figure 2:
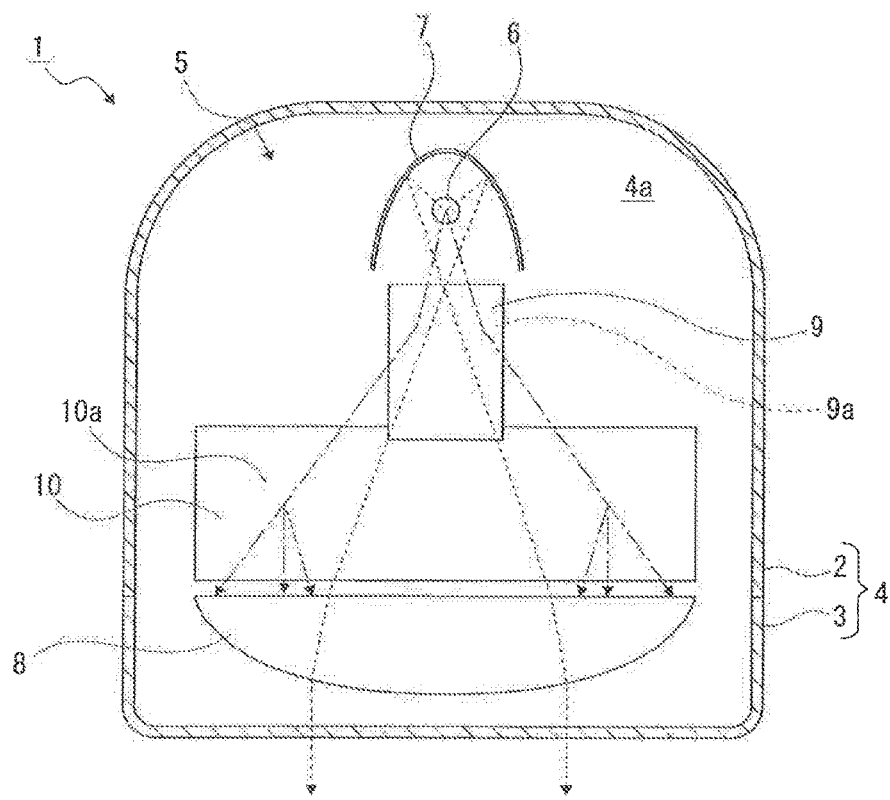
FIG. 2 is a cross-sectional view of the vehicular headlamp according to the first exemplary embodiment when viewed from above.

In the vehicular headlamp 1 configured as described above, when light is emitted from the light source 6, the emitted light excluding a portion thereof is reflected by the reflector 7 and directed toward the projection lens 8 (indicated by a dotted arrow in FIG. 2).

The light which is reflected by the reflector 7 and directed toward the projection lens 8 is incident on the projection lens 8 and is controlled by the projection lens 8 so as to become substantially parallel light. The light is then transmitted through the projection lens 8 and the cover 8 so as to be irradiated toward the outside. At this time, a portion of the light emitted from the light source 6 is shielded by the shade and irradiated toward the outside as the light formed in a predetermined light distribution pattern.

In the meantime, when light emission occurs from the light source 6, there is a light that does not reach the reflector 7. A portion of the light which is not directed toward the reflector 7 is incident on the reflective member 9 and reflected on the light reflective surface 9a toward the reflective plate 10 (indicated by an arrow of a one-dotted chain line in FIG. 2). The light reflected toward the reflective plate 10 is reflected by the reflection control surface 10a and is incident on substantially the entire projection lens 8. In this case, the light incident on the reflection control surface 10a is diffused when reflected by the reflection control surface 10a, and is incident on substantially the entire projection lens 8.

The light which is reflected by the reflection control surface 10a of the reflective plate 10 and is incident on substantially the entire projection lens 8 is emitted from substantially the projection lens 8 and transmitted through the cover 3 so as to be irradiated toward the outside. At this time, at least a portion of the light reflected by the reflective plate 10 and incident on the projection lens 8 is emitted from the projection lens 8 at an angle different from that of the light forming a light distribution pattern, for example, obliquely upward, obliquely downward, or obliquely to the side.

Further, the light formed as a light distribution pattern (substantially parallel light) is emitted from the projection lens 8 in a range from the upper side to less than 5 degrees from the upper side with respect to the optical axis of the projection lens 8, and the upward light reflected by the reflective plate 10 and emitted from the projection lens 8 is emitted, for example, in a range of 5 degrees or more from the upper side.

As described above, in the vehicular headlamp 1, a portion of the light emitted from the light source 6 is reflected by the reflective plate 10 and at least a portion of the light reflected by the reflective plate 10 is emitted in a different direction from the projection lens 8 with respect to the light forming a light distribution pattern.

Therefore, when, for example, a pedestrian or other vehicle's passenger is aware of the presence of a vehicle provided with the vehicular headlamp 1 at night, only a portion of the projection lens 8 may rarely be shined or the projection lens 8 may rarely be shined depending on a viewing angle with respect to the vehicle. Thus, since substantially the entire projection lens 8 may be shined regardless of the viewing angle with respect to the vehicle, the improvement of the visibility of the vehicular headlamp 1 may be achieved.

Further, a reflector 7 which reflects the light emitted from the light source 6 toward the projection lens 8 is provided, and the light which is not reflected by the reflector 7 in the light emitted from the light source 6 is incident on the reflective plate 10.

Therefore, since the light reflected by the reflector 7 is used as a light forming a light distribution pattern and the light not reflected by the reflector 7 is used as a light reflected by the reflective plate 10, the utilization efficiency of the light emitted from the light source 6 may be improved without affecting the light distribution.

Further, since the reflective member 9 reflecting the light, which is not reflected by the reflector 7, toward the reflective plate 10 is provided, the light which is not reflected by the reflector 7 is reflected by the reflective member 9 and is incident on the reflective plate 10 so that light may be surely incident on the reflective plate 10 without increasing the number of light sources 9.

In addition, since the width of the reflective plate 10 in the horizontal direction is equal to or greater than the width of the emission region in the horizontal direction of the projection lens 8, a reflective region of the reflective plate in the horizontal direction 10 becomes more than an emission region in the horizontal direction of the projection lens 8 so that the light reflected by the reflective plate 10 may be surely incident on substantially the entire projection lens 8.

Descriptions have been made above by way of example on a case where the width of the reflective plate 10 in the horizontal direction is equal to or greater than the width of the emission region in the horizontal direction of the projection lens 8. However, the width of the reflective plate 10 in the horizontal direction may be, for example, 70% or more of the emission region in the horizontal direction of the projection lens 8. Even when the width of the reflective plate 10 in the horizontal direction is 70% or more of the emission region in the horizontal direction of the projection lens 8, the light reflected by the reflective plate 10 may be caused to be incident on substantially the entire projection lens 8 by performing, for example, a diffusion process on the reflection control surface 10a.

In addition, since the light reflected by the reflective plate 10 is incident on substantially the entire projection lens 8, a portion of the light emitted from the light source 6 is reflected by the reflective plate 10 and is incident on substantially the entire projection lens 8 to cause light to be emitted from substantially the entire projection lens 8, whereby the effective utilization of light and the improvement of visibility may be achieved.

Further, the emission direction of a portion of the light reflected by the reflective plate 10 from the projection lens 8 is upward with respect to the emission direction of light forming the light distribution pattern from the projection lens 8.

Therefore, since at least a portion of the light reflected by the reflective plate 10 is emitted upward from the projection lens 8 with respect to the light forming the light distribution pattern, in particular, even when the vehicle is viewed obliquely upwardly, for example, by a pedestrian, the visibility may be surely improved.

Next, a vehicular headlamp 1A according to a second exemplary embodiment will be described (see, e.g., FIG. 3).

Further, the vehicular headlamp 1A described below is different from the above-described vehicular headlamp 1 only in that a shade having a reflective surface is arranged.

Thus, only the portion different from that of the vehicular headlamp 1 will be described in detail, and the remaining portions are denoted by the same reference numerals as in the vehicular headlamp 1, the description of which will be omitted.

In the vehicular headlamp 1A, a lamp unit 5A is arranged in a lamp chamber 4a of a lamp outer casing 4. The lamp unit 5A includes a light source 6, a reflector 7, a projection lens 8, and a shade 11. The shade 11 is arranged on the lower front side of the reflector 7 and includes a plate-shaped base portion 12 extending m the vertical direction and an inclined portion 13 protruding obliquely forward and downward from the front end portion of the base portion 12. A surface of the inclined portion 13 continuous to the front end of the upper surface of the base portion 12 is formed as a reflective surface 13a. Therefore, the reflective surface 13a is formed as a surface facing obliquely upward and forward.

The reflective plate 10 is arranged in front of the shade 11.

Figure 3:
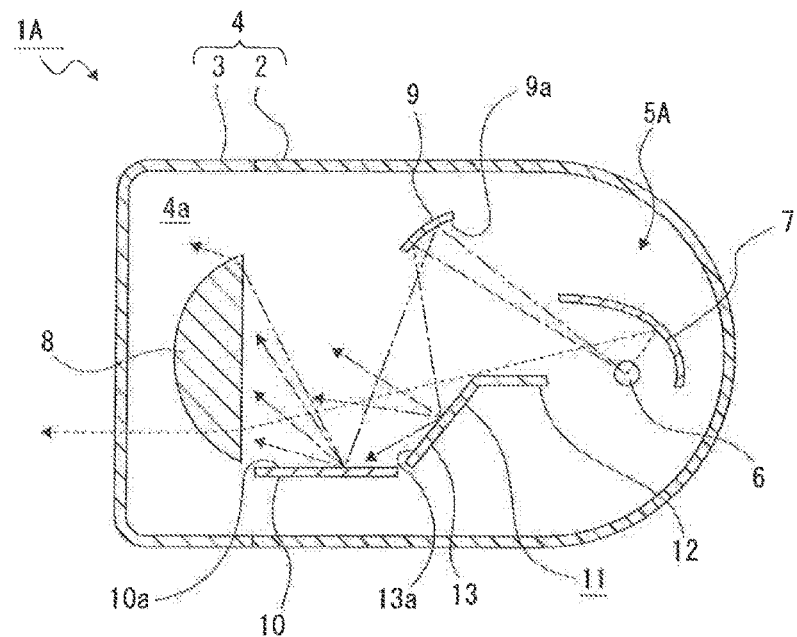
FIG. 3 is a cross-sectional view of a vehicular headlamp according to a second exemplary embodiment when viewed laterally.

In the vehicular headlamp 1A configured as described above, when light is emitted from the light source 6, the emitted light excluding a portion thereof is reflected by the reflector 7 and directed toward the projection lens 8 (indicated by a dotted arrow in FIG. 3).

The light which is reflected by the reflector 7 and directed toward the projection lens 8 is incident on the projection lens 8 and is controlled by the projection lens 8 so as to become a substantially parallel light. The light is then transmitted through the projection lens 8 and the cover 8 so as to be irradiated toward the outside. At this time, a portion of the light emitted from the light source 6 is shielded by the shade 11 and irradiated toward the outside as the light formed in a predetermined light distribution pattern.

In the meantime, when light emission occurs from the light source 6, there is a light that does not reach the reflector 7. A portion of the light which is not directed toward the reflector 7 is incident on the reflective member 9 and reflected on the light reflective surface 9a toward the reflective plate 10 and the reflective surface 13a of the shade 11 (indicated by an arrow of a one-dotted chain line in FIG. 3). The light reflected toward the reflective plate 10 and the light reflected toward the reflective surface 13a are reflected by the reflection control surface 10a and the reflective surface 13a, respectively, so as to be incident on substantially the entire projection lens 8. In this case, the light incident on the reflection control surface 10a is diffused when reflected by the reflection control surface 10a, and is incident on substantially the entire projection lens 8.

Further, surface treatment such as embossing, vapor deposition, or gloss removal may be performed on the reflective surface 13a, and when surface treatment such as embossing is performed on the reflective surface 13a, the light incident on the reflective surface 13a is also diffused when reflected by the reflective surface 13a, and is incident on substantially the entire projection lens 8.

The light which is reflected by the reflection control surface 10a of the reflective plate 10 and the reflective surface 13a of the shade 11 and is incident on substantially the entire projection lens 8 is emitted from substantially the projection lens 8 and transmitted through the cover 3 so as to be irradiated toward the outside. At this time, at least a portion of the light reflected by the reflection control surface 10a and the reflective surface 13a and incident on the projection lens 8 is emitted from the projection lens 8 at an angle different from that of the light forming a light distribution pattern, for example, obliquely upward, obliquely downward, or obliquely to the side.

As described above, in the vehicular headlamp 1A, a portion of the light emitted from the light source 6 is reflected by the reflective plate 10 and the shade 11, and at least a portion of the light reflected by the reflective plate 10 is emitted in a different direction from the projection lens 8 with respect to the light forming a light distribution pattern.

Therefore, when, for example, a pedestrian or other vehicle's passenger is aware of the presence of a vehicle provided with the vehicular headlamp 1A at night, only a portion of the projection lens 8 may rarely be shined or the projection lens 8 may rarely be shined depending on a viewing angle with respect to the vehicle. Thus, since substantially the entire projection lens 8 may be shined regardless of the viewing angle with respect to the vehicle, the improvement of the visibility of the vehicular headlamp 1A may be achieved.

The shade 11 is provided in the vehicular headlamp 1A, the reflective surface 13a which reflects light toward the projection lens 8 and the reflective plate 10 is formed on the shade 11, and the light reflected by the reflective member 9 is incident on the reflective plate 10 and the reflective surface 13a.

Therefore, the light emitted from the light source 6 is shielded and reflected by the shade 11 and light may be caused to be incident on substantially the entire projection lens 8 after the improvement of the functionality is achieved.

Further, the light reflected by both the reflective plate 10 and the reflective surface 13a is reflected toward the projection lens 8 as the light reflected by the reflective member 9 is directed toward both the reflective plate 10 and the reflective surface 13a. Thus, the amount of light incident on the projection lens 8 may be increased, whereby the improvement of the utilization efficiency of light may be achieved.

Next, a vehicular headlamp 1B according to a third exemplary embodiment will be described (see, e.g., FIG. 4).

Further, the vehicular headlamp 1B described below is different from the above-described vehicular headlamp 1 only in that two projection lenses and two reflective members are arranged. Thus, only the portion different from that of the vehicular headlamp 1 will be described in detail, and the remaining portions are denoted by the same reference numerals as in the vehicular headlamp 1, the description of which will be omitted.

In the vehicular headlamp 1B, a lamp unit 5B is arranged in a lamp chamber 4a of a lamp outer casing 4. The lamp unit 5B includes a light source 6, a reflector 7, a first projection lens 8X, and a second projection lens 8Y.

The first projection lens 8X and the second projection lens 8Y are arranged to be spaced apart from each other, for example, on the left and right sides, the first projection lens 8X is arranged immediately in front of the reflector 7, and the reflective plate 10 is arranged immediately behind the second projection lens 8Y.

In the lamp chamber 4a, a first reflective member 9X and a second reflective member 9Y are arranged so as to be spaced laterally from each other. The first reflective member 9X is arranged between the reflector 7 and the first projection lens 8X and the second reflective member 9Y is arranged behind the reflective plate 10. The first reflective member 9X and the second reflective member 9Y are formed in a concave curved shape in a direction facing each other (substantially in a lateral direction), and the concave surfaces facing each other are formed as curved light reflective surfaces 9x and 9y.

Figure 4:
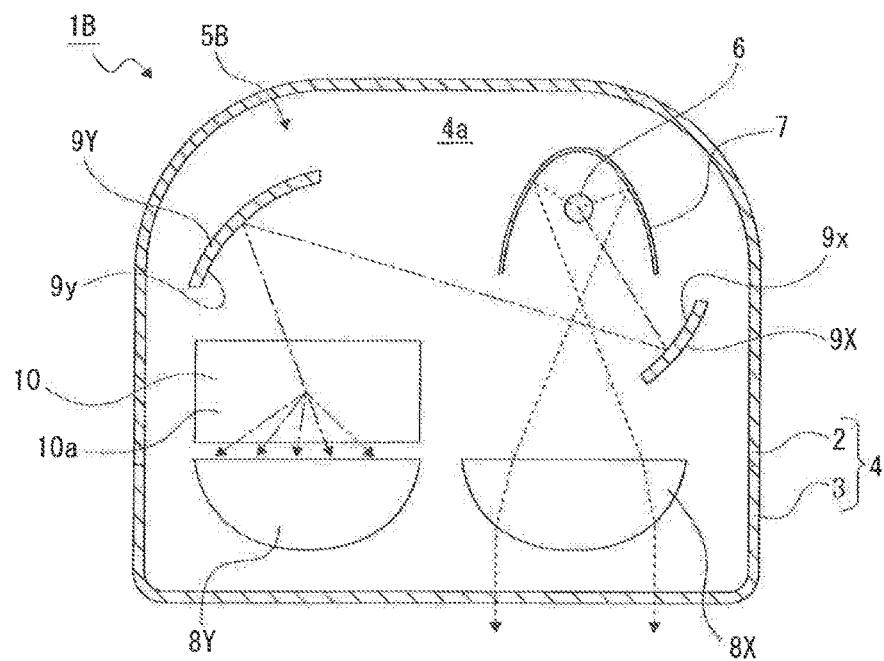
FIG. 4 is a cross-sectional view of a vehicular headlamp according to a third exemplary embodiment when viewed from above.

In the vehicular headlamp 1B configured as described above, when light is emitted from the light source 6, the emitted light excluding a portion thereof is reflected by the reflector 7 and directed toward the first projection lens 8X (indicated by a dotted arrow in FIG. 4).

The light which is reflected by the reflector 7 and directed toward the first projection lens 8X is incident on the first projection lens 8 and is controlled by the first projection lens 8X so as to become a substantially parallel light. The light is then transmitted through the first projection lens 8X and the cover 3 so as to be irradiated toward the outside. At this time, a portion of the light emitted from the light source 6 is shielded by the shade and irradiated toward the outside as the light formed in a predetermined light distribution pattern.

In the meantime, when light emission occurs from the light source 6, there is a light that does not reach the reflector 7. A portion of the light which is not directed toward the reflector 7 is incident on the first reflective member 9X, reflected on the light reflective surface 9x toward the second reflective member 9Y, and reflected on the light reflective surface 9y of the second reflective member 9Y toward the reflective plate 10 (indicated by an arrow of a one-dotted chain line in FIG. 4). The light reflected toward the reflective plate 10 is reflected by the reflection control surface 10a and is incident on substantially the entire second projection lens 8Y. In this case, the light incident on the reflection control surface 10a is diffused when reflected by the reflection control surface 10a, and is incident on substantially the entire second projection lens 8Y.

The light reflected by the reflection control surface 10a of the reflective plate 10 and incident on substantially the entire second projection lens 8Y is emitted from substantially the entire second projection lens 8Y and transmitted through the cover 3 so as to be irradiated toward the outside. At this time, at least a portion of the light reflected by the reflective plate 10 and incident on the second projection lens 8Y is emitted from the second projection lens 8Y at an angle different from that of the light forming a light distribution pattern, for example, obliquely upward, obliquely downward, or obliquely to the side.

As described above, in the vehicular headlamp 1B, a portion of the light emitted from the light source 6 is reflected by the reflective plate 10, and at least a portion of the light reflected by the reflective plate 10 is emitted in a different direction from the second projection lens 8Y with respect to the light forming a light distribution pattern.

Therefore, when, for example, a pedestrian or other vehicle's passenger is aware of the presence of a vehicle provided with the vehicular headlamp 1B at night, only a portion of the second projection lens 8Y may rarely be shined or the second projection lens 8Y may rarely be shined depending on a viewing angle with respect to the vehicle. Thus, since substantially the entire second projection lens 8Y may be shined regardless of the viewing angel with respect to the vehicle, the improvement of the visibility of the vehicular headlamp 1B may be achieved.

Further, a first projection lens 8X for forming a light distribution pattern and a second projection lens 8Y on which the light reflected sequentially by the first reflective member 9X, the second reflective member 9Y, and the reflective plate 10 is incident are provided in the vehicular headlamp 1B.

Therefore, since a light distribution pattern is formed by the light transmitted through the first projection lens 8X and the light reflected sequentially by the first reflective member 9X, the second reflective member 9Y, and the reflective plate 10 is incident on the second projection lens 8Y, the light emitted from the light source 6 does not affect the light distribution, whereby the number of light sources may not be increased and the effective utilization of light may be achieved.

Further, in the same manner as in the vehicular headlamps 1 and 1A, the reflective plate 10 may be arranged between the first projection lens 8X and the reflector 7 in the vehicular headlamp 1B so that a portion of the light emitted from the light source 6 is reflected by the reflective plate 10 and the light reflected by the reflective plate 10 is emitted from the first projection lens 8X at an angle different from that forming the light distribution pattern.

By adopting such a configuration, only a portion of the first projection lens 8X may rarely be shined or the first projection lens 8X may rarely be shined depending on a viewing angle with respect to the vehicle. Thus, since substantially the entire first projection lens 8X may be shined regardless of the viewing angel with respect to the vehicle, the improvement of the visibility of the vehicular headlamp 1B may be achieved.

In the above-described example, the vehicular headlamps 1, 1A, and 1B are provided with one light source 6, but a plurality of light sources 6 may be provided. The plurality of light sources 6 are provided, whereby the occurrence of the difference in brightness among the emission regions of the lights emitted from the projection lens 8, the first projection lens 8X, and the second projection lens 8Y may be suppressed.

Further, when the plurality of light sources 6 are provided, at least one light source 6 may be used as a dedicated light source 6 that forms a light distribution pattern and at least another light source 6 may be used as a dedicated light source 6 that causes light to be incident on the reflective plate 10.

In addition, the shining appearance of the projection lens 8 may be freely adjusted by adjusting an amount of light that is incident on substantially the entire projection lens 8 and the entire second projection lens 8Y from the reflective plate 10 or the reflective surface 13a or adjusting an amount of light that is incident on each portion of the projection lens 8 by surface treatment such as embossing on the reflection control surface 10a or reflective surface 13a of the reflective plate 10.

Further, the reflective plate 10 may be formed of various materials, and the reflective plate 10 may be formed of any one of, for example, a resin material and a metal material. The reflective plate 10 is formed of a metal material so that the fusion of the reflective plate 10 may be suppressed when a sunlight is incident on the reflective plate 10 via the projection lens 8 or the second projection lens 8Y. In the meantime, since the reflective plate 10 is formed of a resin material, the reflective plate 10 may be lightweight and the overall weights of the vehicular headlamps 1, 1A, and 1B may be reduced.

Further, even when the reflective plate 10 is formed of any one of a resin material and a metal material, the reflective plate 10 may be formed integrally with, for example, the lamp housing 2 and each of the members arranged in the lamp chamber 4a. Similarly, the reflective member 9, the first reflective member 9X, and the second reflective member 9Y may be formed integrally with the lamp housing 2 and each of the members arranged in the lamp chamber 4a.

Further, the reflective plate 10, the reflective member 9, the first reflective member 9X, and the second reflective member 9Y may be provided as a portion of an extension that shields each portion arranged in, for example, the lamp chamber 4a.

In addition, it is possible to suppress the generation of dazzling light for passengers in the preceding vehicle or the opposite vehicle due to the light emitted from the projection lens 8, the first projection lens 8X, and the second projection lens 8Y depending on the arrangement angle of, for example, the reflective plate 10, the reflective member 9, the first reflective member 9X, and the second reflective member 9Y, and the processing condition of the surface treatment such as embossing on the reflection control surface 10a of the reflective plate 10 and the reflective surface 13a of the shade 11.

Further, the vehicular headlamps 1, 1A, and 1B of a so-called reflection optical system having the reflector 7 have been described above as an example. However, the present disclosure is applicable to a vehicular headlamp of a direct optical system having no reflector. In the vehicular headlamp of the direct optical system, a light distribution pattern is formed by the light that is emitted from a light source and does not reach a reflective plate and a portion of the light that is emitted from the light source and does not form the light distribution pattern is reflected by the reflective plate so as to be incident on substantially the entire projection lens.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicular headlamp comprising:
a light source configured to emit light;
a projection lens through which the light emitted from the light source is transmitted; and
a reflective plate which is positioned between the light source and the projection lens so as to reflect a portion of the light emitted from the light source toward the projection lens,
wherein the light incident on the reflective plate is diffused when reflected by the reflective plate such that the reflected light is incident on substantially an entire projection lens and an emission direction of at least a portion of the light reflected by the reflective plate from the projection lens is different from an emission direction of light that is emitted from the projection lens and forms a light distribution pattern.

2. The vehicular headlamp of claim 1, further comprising:
a reflector configured to reflect the light emitted from the light source toward the projection lens,
wherein light which is not reflected by the reflector in the light emitted from the light source is incident on the reflective plate.

3. The vehicular headlamp of claim 2, further comprising:
a reflective member configured to reflect the light which is not reflected by the reflector at least toward the reflective plate.

4. The vehicular headlamp of claim 3, further comprising:
a shade provided between the light source and the projection lens to shield a portion of the light emitted from the light source,
wherein the shade has a reflective surface formed thereon to reflect light at least toward the reflective plate, and the light reflected by the reflective member is incident on the reflective plate and the reflective surface.

5. The vehicular headlamp of claim 4, wherein the projection lens is configured by a first projection lens that forms a light distribution pattern and a second projection lens on which the light reflected sequentially by the reflective member and the reflective plate is incident.

6. The vehicular headlamp of claim 1, wherein a width of the reflective plate in a horizontal direction is equal to or greater than a width of an emission region in a horizontal direction of the projection lens, on which the light reflected by the reflective plate is incident.

7. The vehicular headlamp of claim 1, wherein the reflective surface includes a treated surface such that the light incident on the reflective surface is diffused and reflected in a predetermined direction.

8. The vehicular headlamp of claim 1, wherein a treatment of the treated surface includes embossing, vapor deposition, or gloss removal.

9. A vehicular headlamp comprising:
a light source configured to emit light;
a first projection lens and a second projection lens through which the light emitted from the light source is transmitted;
a reflective plate which is positioned between the light source and the second projection lens so as to reflect a portion of the light emitted from the light source toward the second projection lens;
a reflector configured to reflect the light emitted from the light source toward the first projection lens; and
a reflective member configured to reflect the light which is not reflected by the reflector at least toward the reflective plate,
wherein an emission direction of at least a portion of the light sequentially reflected by the reflective member and the reflective plate from the second projection lens is different from an emission direction of light that is emitted from the first projection lens and forms a light distribution pattern.

10. The vehicular headlamp of claim 9, wherein the light reflected by the reflective plate is incident on substantially the entire projection lens.

11. The vehicular headlamp of claim 9, wherein the reflective member includes a first reflective member and a second reflective member.

12. A vehicular headlamp comprising:
a light source configured to emit light;
a projection lens through which the light emitted from the light source is transmitted; and
a reflective plate which is positioned between the light source and the projection lens so as to reflect a portion of the light emitted from the light source toward the projection lens,
wherein an emission direction of at least a portion of the light reflected by the reflective plate from the projection lens is different from an emission direction of light that is emitted from the projection lens and forms a light distribution pattern and the emission direction of at least a portion of the light reflected by the reflective plate from the projection lens is upward with respect to the emission direction of the light forming the light distribution pattern from the projection lens.

* * * * *